INVENTORS
GEORGE W. PATTERSON
ROBERT H. SCHAFER
DONALD L. STEVENS
BY
Laurence R. Brown
ATTORNEY Dec. 26, 1961 G. W. PATTERSON ET AL 3,014,660

ADDRESS SELECTION MEANS

Filed Oct. 1, 1956 13 Sheets-Sheet 2

INVENTORS
GEORGE W. PATTERSON
ROBERT H. SCHAFER
DONALD L. STEVENS

BY

Laurence R. Brown

ATTORNEY

Dec. 26, 1961 G. W. PATTERSON ET AL 3,014,660

ADDRESS SELECTION MEANS

Filed Oct. 1, 1956

13 Sheets-Sheet 3

INVENTORS
GEORGE W. PATTERSON
ROBERT H. SCHAFER
DONALD L. STEVENS

BY Lawrence R. Brown

ATTORNEY

ADDRESS SELECTION MEANS

Filed Oct. 1, 1956

INVENTORS
GEORGE W. PATTERSON
ROBERT H. SCHAFER
DONALD L. STEVENS
BY
Laurence R. Brown
ATTORNEY INVENTORS
GEORGE W. PATTERSON
ROBERT H. SCHAFER
DONALD L. STEVENS
BY Laurence R. Brown
ATTORNEY

INVENTORS
GEORGE W. PATTERSON
ROBERT H. SCHAFER
DONALD L. STEVENS

BY Lawrence R. Brown
ATTORNEY

ADDRESS SELECTION MEANS

Filed Oct. 1, 1956

INVENTORS
GEORGE W. PATTERSON
ROBERT H. SCHAFER
DONALD L. STEVENS
BY
Laurence R. Brown
ATTORNEY INVENTORS
GEORGE W. PATTERSON
ROBERT H. SCHAFER
BY DONALD L. STEVENS
Laurence R. Brown
ATTORNEY INVENTORS
GEORGE W. PATTERSON
ROBERT H. SCHAFER
DONALD L. STEVENS
BY
Laurence R. Brown
ATTORNEY

INVENTORS
GEORGE W. PATTERSON
ROBERT H. SCHAFER
DONALD L. STEVENS

BY Laurence R. Brown
ATTORNEY

ADDRESS SELECTION MEANS

Filed Oct. 1, 1956 13 Sheets-Sheet 11

INVENTORS
GEORGE W. PATTERSON
ROBERT H. SCHAFER
DONALD L. STEVENS
BY
Lawrence R. Brown
ATTORNEY INVENTORS
GEORGE W. PATTERSON
ROBERT H. SCHAFER
DONALD L. STEVENS
BY Laurence R. Brown
ATTORNEY a
I · H · WBC · (TL=4v5v6v7) ⇒ SET CN3 (GO TO STATE 5)

b
5 · ~D · DDI · ~DD2 · ARO · H ⇒ COUNT
5 · H · WBC ⇒ RESET CNI (GO TO STATE 4)

c
4 · H · B · (TL=4v6) ⇒ FIRE E
4 · H · B · (TL=5v6) ⇒ FIRE F
4 · H · B · TL=7 ⇒ FIRE BAND STEPPING SWITCH
4 · H · B ⇒ COUNT VI
4 · H · C · VI=9 ⇒ RESET CN3 (GO TO STATE 0)

d

INVENTORS
GEORGE W. PATTERSON
ROBERT H. SCHAFER
DONALD L. STEVENS
BY Laurence R. Brown
ATTORNEY United States Patent Office 3,014,660
Patented Dec. 26, 1961

3,014,660

ADDRESS SELECTION MEANS

George W. Patterson, Swarthmore, Robert H. Schafer, Paoli, and Donald L. Stevens, Broomall, Pa., assignors to Burroughs Corporation, Detroit, Mich., a corporation of Michigan Filed Oct. 1, 1956, Ser. No. 612,990
4 Claims. (Cl. 235—157)

This invention relates to data processing apparatus and more specifically it relates to address selection means for specifying memory locations in externally programmed data processing systems.

General purpose data processing systems are operated by instructions set up in a program word specifying both control and address information. Thus, the control portion of the program word will specify such operations as add, shift, transfer or halt, and the address portion will specify a memory position which will supply the necessary data. In a single address system, all the operations are referenced to data located in a working register, generally an accumulator register. A typical program work for a single address system might therefore read $+ab$ where the $+$ specifies addition of the data found in memory location $ab$ to the quantity found in the accumulator.

Instructions are supplied to a data processing system by either external or internal program means. Internal program means provides for storing a series of the program words in consecutive positions in the memory. With programs in the memory, control circuits are included inherently in the system for removing program words and modifying them in the data processing or arithmetic unit. This permits flexibility of operation not available with externally programmed systems. An external program specifies the sequence of instructions in punched tape, cards, pinboard, or some other means which normally does not permit the program to be processed in the arithmetic unit. To state it in another way, in an externally programmed machine, the program is stored in a form which cannot be operated on by the arithmetic section of the computer whereas in an internally programmed machine, the program is stored in memory means within the computer and the program can be operated on by the arithmetic section of the computer. Herein lies a basic difference between externally and internally programmed machines as the terms are used in the art and in this specification.

External programming therefore results in such inflexibility that certain data processing operations become quite cumbersome, and require a large number of program steps thereby using up available program storage and requiring more operating time. For example, in programming a matrix multiplication problem it is usually desirable for cycling through a number of consecutive memory locations during different passes through an iterative routine. In an internally programmed machine, the memory location specified by the program word may be modified by adding one for each iteration. However, with an external program each successive memory location must be specified by a separate program step. Furthermore, a sorting or classification operation is difficult to set up with external program means. Suppose that it is desirable to accumulate information in a plurality of categories each specified in random memory positions. This might be required for inventory control where sales figures of specified items are totaled to the sum already contained in specified memory locations. Likewise, it may be required in banking operations for adding or deducting items in different accounts.

If address modifications are unpredictable, such as in accumulating by categories without preliminary sequencing, and address counting or cycling through consecutive memory locations is available, a count and compare routine can be utilized. This, however, requires ten or more counting steps per category. Thus, with an external program, even when providing auxiliary address registers capable of sequencing or counting, and particularly with single address operation, several extra steps requiring considerable operating time must be used to specify the account or memory location and to register the required data. Accordingly, external program means, as known in the art, lacks the flexibility and utility required for general purpose data processing systems.

Either by supplying a series of optional program registers with a separate arithmetic system for operation thereon and with control circuits for selecting the required registers, or by transferring external program information into internal registers for operation therefrom after which it is returned to address registers, some of the disadvantages of external programming may be overcome. These are expensive alternatives however, and the system utilizing these expedients in essence becomes internally programmed. It is desirable to utilize the external program information directly, without internal buffer memories, to reduce memory, to prevent errors in transition and to provide access without complex control circuits.

It is therefore an object of the invention to improve externally programmed data processing systems.

Another object of the invention is to increase flexibility of operation in data processing systems utilizing external program means.

A further object of the invention is to provide general purpose data processing systems capable of increased computation speeds and requiring less program memory.

A still further object of the invention is to provide program changes to be specified by internal system conditions.

It is a still further object of this invention to enable programming of an externally programmed computer to be carried out with simplicity and ease but which incorporates the flexibility of operation obtainable by internally programmed machines.

In accordance with one embodiment the present invention therefore is an externally programmed, single address data processing system and is provided with an optionally used internal auxiliary register for retaining the address information at a specified program word only. The auxiliary register is coupled to communicate with the arithmetic or data processing means. Thus, the address may be specified by a portion of the data information being processed, and this portion may be entered into the accumulator and modified by adding, shifting, removing to the address register or other arithmetic operations. Although the address is capable of manipulation in the arithmetic section when required, the address register, either internal or external, is used directly for specifying the desired memory location. Optional selection of the auxiliary address rather than the programmed address is specified by special program instructions. The auxiliary address register is made to count directly in response to further special program instructions to afford progressive scanning of consecutive memory locations. The main advantages of internally programmed machines are made possible by further instructions permitting the auxiliary address register to extract information from data in the accumulator without requiring internal program storage space, and retaining the advantage of more easily modified programs without excessive control means supplied by external programming devices.

In the system embodiment employing the present invention, control circuits as well as address locating circuits are actuated in response to address signals from the auxiliary address register, which address signals are derived as a result of communication between the auxiliary address register and information which is located in certain positions in the accumulator of the arithmetic section of the computer. Both this expedient and the exclusive use of external control information, serve to simplify the control circuits required for operation of the auxiliary memory and the general system.

Further features and objects of the invention are found throughout the following specification and the accompanying drawings, in which.

Figure 1:
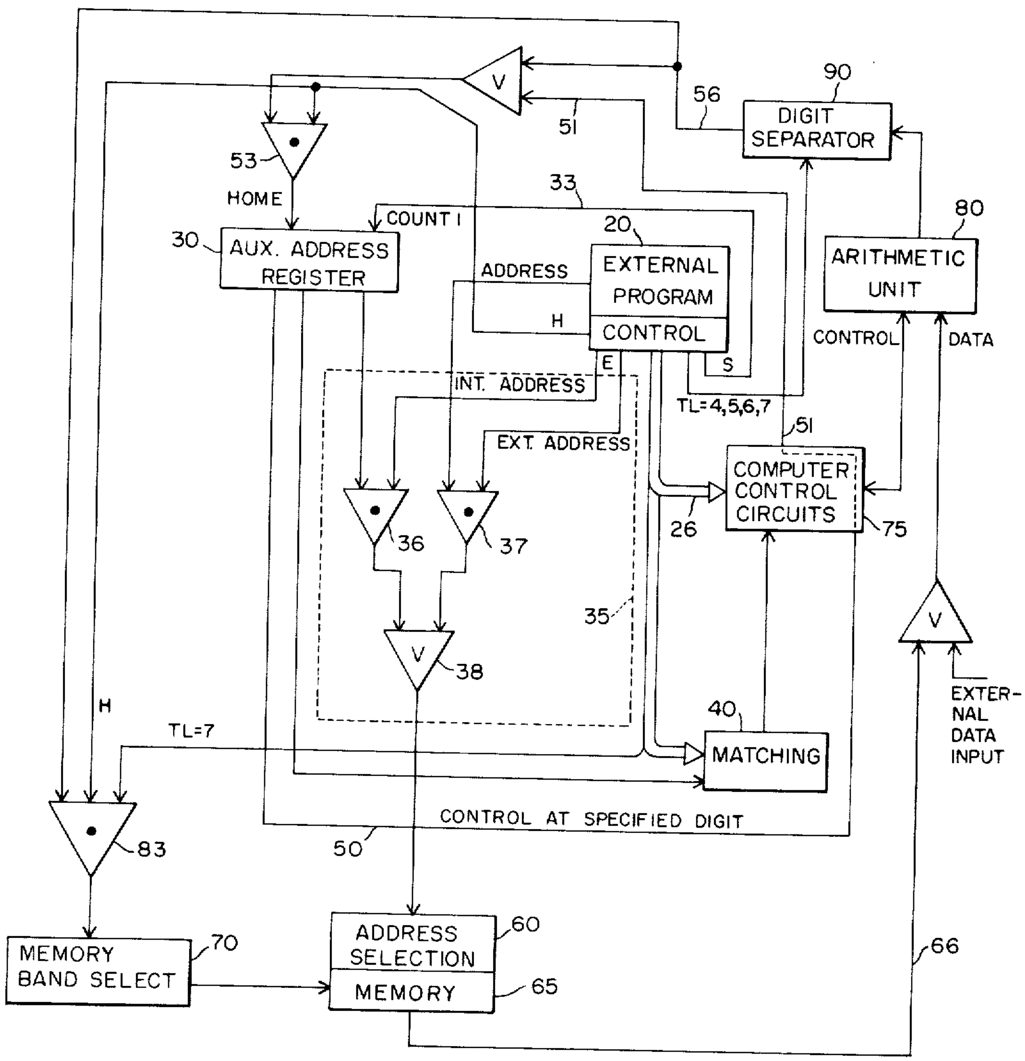
FIG. 1 is a block system diagram of an improved computer system afforded by the invention.

Throughout the respective figures of the drawing, like reference characters will be used to designate similar features in order to facilitate comparison. Wherever possible, block diagrams and logical circuits are utilized to avoid an unnecessarily detailed presentation which would obscure the nature of the invention. Although the accompanying disclosure sets forth all those features necessary for an understanding of the invention, reference is made herein to other copending applications in which complete computer systems are described in detail, and which include full explanation of circuit details of those computer sections shown in simplified block or logical form in this specification.

Figure 2:
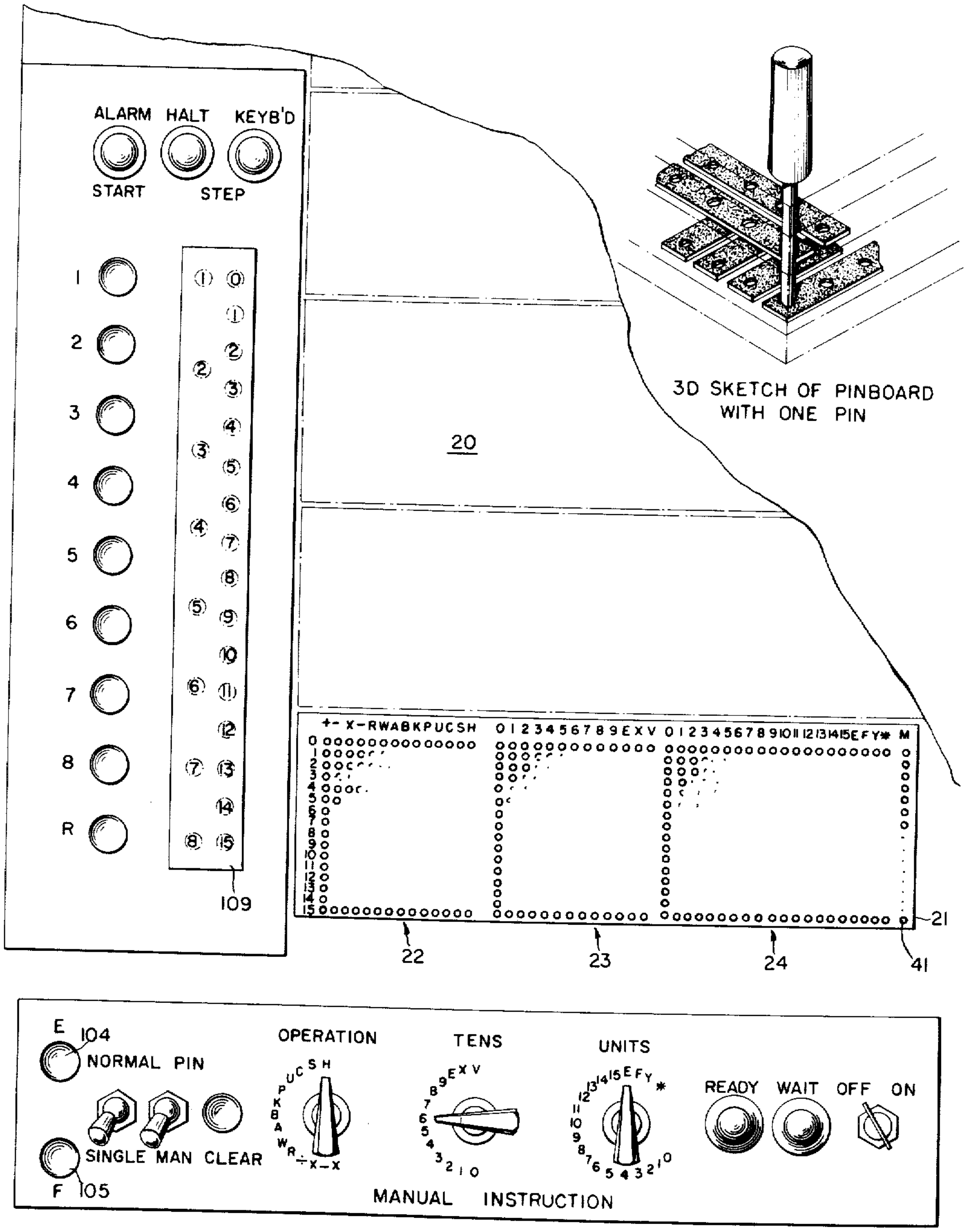
FIG. 2 is a partial plan view of external programming means used in an embodiment of the invention.

In the block logical computer system diagram of FIGURE 1, a typical electronic computer organization is illustrated similar to that computer described in the co-pending United States application of George G. Hoberg, S.N. 492,062, filed March 4, 1955. In this computer, external programming means 20 is employed, comprising a pinboard array as shown in FIGURE 2. Each pinboard 21 therein is provided generally with three sections, 22, 23 and 24, which respectively supply a single program control character and two program address characters. Thus, each pinboard 21 will provide at the several rows, 0–15, a series of 16 program steps, each of which may receive three pins to provide the specified operation. The program is automatically scanned in the computer operation so that at the completion of one program function specified at a row the next in sequence will be initiated. The computer is a single-address computer utilizing the program control specified in the pinboard directly so that each instruction is referenced to the internal accumulator, which is described hereinafter. Program control is effected directly in the computer control circuit section 75 of FIGURE 1 from the external program control word portion without intermediate buffer means as signifed by the cable 26.

The internal memory specified by the pinboard address section comprises 100 memory selections which are provided by ten tracks on a magnetic drum, each track having ten sectors. Thus, the address portion of the program word specifies a two-digit decimal number wherein the tens level (TL) signifies the drum track and the units level (UL) signifies the sector location.

In accordance with the present invention, an internal auxiliary address register 30 is employed in the manner shown in FIGURE 1. This register may be utilized for storing either one or both of the address digits and serves to directly supply address information to the address selection circuits 60 without interchange from register to register. In one form the address register may comprise a stepping switch E, as shown schematically in FIGURE 3. This stepping switch includes four switching banks which perform the respective functions of providing the tens level address character, providing the units level address character, performing a matching operation and signifying control at a specified address digit count. Thus, when a specified column, such as E, in the ten level pinboard section 23 (FIG. 2) is pinned, the position registered in the stepping switch is utilized to select the corresponding drum track rather than an externally specified address character.

Likewise, when the column E is pinned in the units level pinboard section 24, the second section of the stepping switch designates the proper sector locating circuit. Thus, two banks of stepping switch E perform the function of the auxiliary address register 30 in FIGURE 1 in designating the desired internal address selection when the program control set up on pinboard sections 23 and 24 specify an internal address rather than the external address usually programmed on the pinboard. The pinboard external address would be specified by placing a pin in one of the digit columns 0 through 9 of the respective tens and units level pinboard sections 23 or 24 rather than in the E column. Thus the switching function of the address selecting means 35 of FIGURE 1 is preformed in one embodiment of the invention by the specified instruction E available in the external pinboard to specify an alternate address character. The "and" circuits 36 and 37, therefore, signify gating of either internal address or external address information through the "or" circuit 38 to the address selection portion 60 of the memory, although "and" circuit 36 may not be required when address information is fed directly to "or" circuit 38 in a normal fashion in the absence of a pinned E program control signal.

The auxiliary register is adapted for modification by counting under control of the external programming means 20 at lead 33. This is accomplished in FIGURE 3 by the E switch stepper circuit 34, which is operated for counting in the computer of the co-pending application above-mentioned by the logical condition shown at the corresponding "and" circuit 25. The external program means 20 (FIG. 1) provides a stepping instruction such as that in pinboard section 22 of FIGURE 2, labelled column S. This instruction signifies "step the auxiliary address register (counter E) one position when the computer is in state 1 and in the presence of a "C" clock pulse." In this manner iterative routines requiring use of successive memory locations may be programmed by including a stepping instruction in each program loop.

Figure 3:
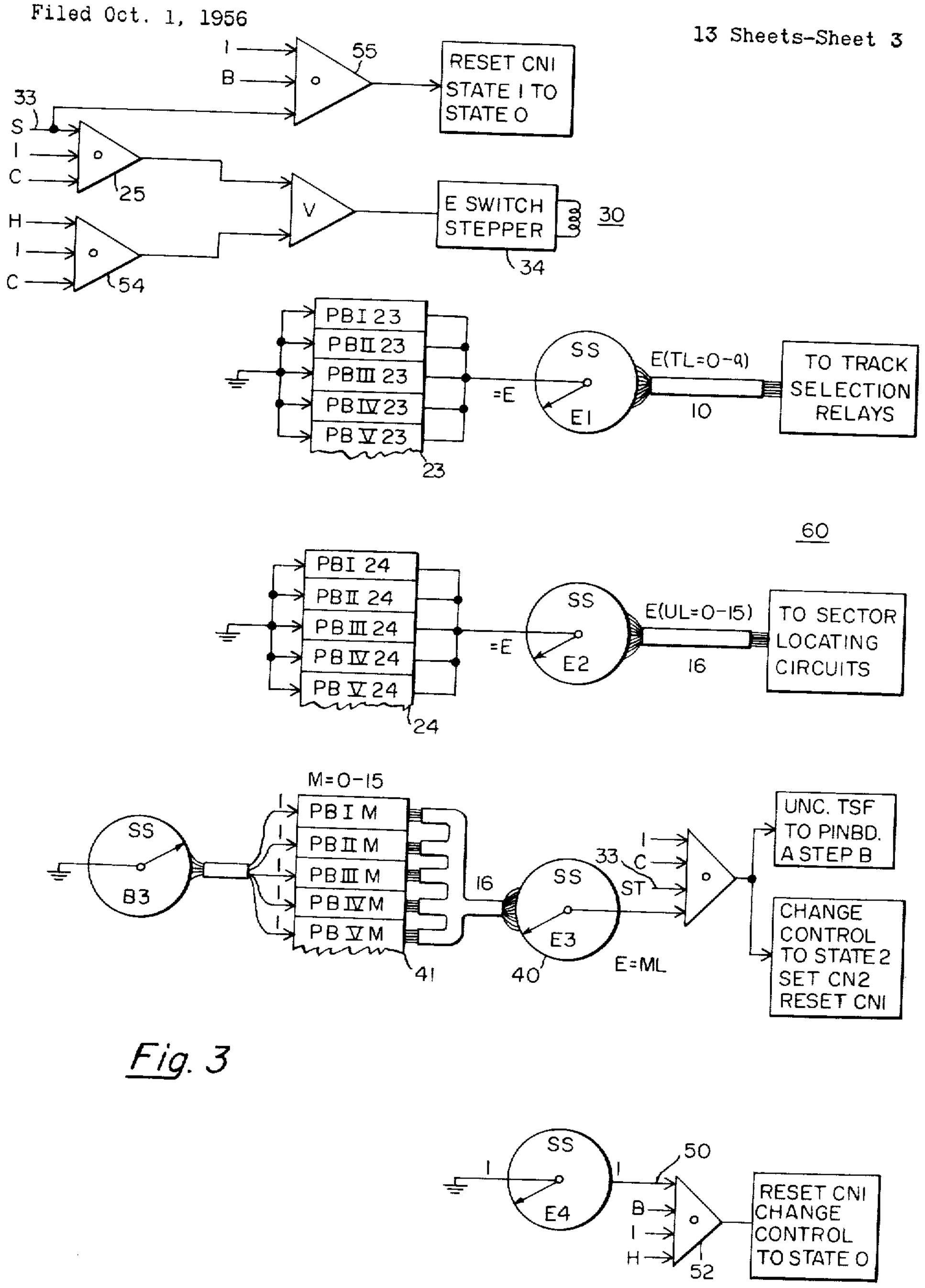
FIG. 3 is a logical block diagram of an auxiliary address register utilized in accordance with one embodiment of the invention.

The auxiliary address register itself is constructed to simplify control circuits necessary for performing its various functions. Accordingly the matching function is performed with the matching means 40 at switch bank 3. Thus, a special matching column M may be specified in column 41 of the pinboard 21 (FIG. 2) for signifying the matching operation. As shown in FIGURE 3, the third section of the E stepping switch performs the matching function when in the memory position pinned by the corresponding pinboard section 41, which causes various control functions necessary in the computer to be performed. A match is reached when the switch is in the position specified by a pin in column M. One logical function specified for this operation is the unconditional transfer to a particular pinboard and a particular step, and the corresponding change of control state to that required for performing the transfer operation.

Further control is specified at lead 50 of FIGURE 1 as performed by stepping switch section 4 of FIGURE 3 whenever a specified digit count is reached by the auxiliary address register 30. This control is used for re-set or homing of the address counter, as indicated at lead 51 of FIGURE 1. Thus, the pinboard homing instruction H in column 22 (FIGURE 2) instructs that the stepping switch E be homed to the position signified by a digit specified at lead 50 when the computer is in state 1 and the B clock pulse is received. In FIGURE 3 this function is performed in "and" circuit 52, which serves to change control from state "1" to state "0," and thereby prevent further stepping of the switch. Accordingly, the homing operation is accomplished, as shown in FIGURE 1, by a typical "and" circuit 53 under control of both the external program means and the computer control circuits 75. The same type of comparison is made at "and" circuit 53 for a digit specified at lead 56. This digit is removed from a portion of the internal data processed in the arithmetic unit 80 by the digit separator circuit 90. Program instructions H4– through H6– can be utilized for specifying the separation of digits from the arithmetic unit for homing the auxiliary address register.

The homing instruction H is also accompanied by stepping of the E switch, once for each revolution of the memory drum, during state "1" when a "C" pulse is presented, as signified at "and" circuit 54 of FIGURE 3. During the stepping operation (S), the control is sent to the idling state (O) at "and" circuit 25, a half drum memory revolution after the "C" pulse stepping action when a "B" clock pulse is presented. Thus, the stepping operation (S) provides a single count by stepping switch E once for each pinned program step, whereas the homing operation (H) provides continued stepping until the specified home digit is reached by change of control to state "O" at "and" circuit 52. Typical pinned external programs for operation of the E switch are HO*b* (where "*b*" is any number from 0 to 15), for homing the E switch to "*b*," H4– for advancing the E switch by the number of places stored in the least significant digit of the accumulator of the arithmetic unit 80. Stepping programs similarly may be provided.

The memory section 65 (FIG. 1) provides, at lead 66, for processing in the arithmetic section 80, data found in that memory location which is designated by the address selection means 60. Expanded memory may be provided having several different memory bands compatible address designations. The bands may be signified in some memory band selection means 70, such as specified in detail in FIGURE 4. FIGURE 5 illustrates the general orientation of such information upon a typical magnetic drum. As seen in FIGURE 5, there is provision for 22 different recording tracks on drum 67, with the specified ten storage sectors for each track. This permits storage of 220 words in separate address locations identified by the same decimal address characters *ab* from "00" to "99."

In order to retain compatibility of instructions with a 100 word memory system, 16 of the storage tracks are broken up into bands 0 through 3, each comprising four tracks. Thus, any one of the four bands may be selected with fixed tracks T4 through T9 to supply the first four tracks $T_0$ through $T_3$ specified by the memory address tens digits of 0 through 3. From the drawing of FIG. 5 it is seen that each band therefore has designated tracks numbered from $T_0$ through $T_3$ whereas tracks 4 through 9 are permanently connected for selection by the corresponding address characters 40 through 99. Accordingly, the addresses 00 through 39 may designate information lying in any one of the bands 0 through 3 and separate provision is made for selecting the desired band. In this manner whenever it is desired to step from one memory band to another, an address instruction may be given.

Figure 4:
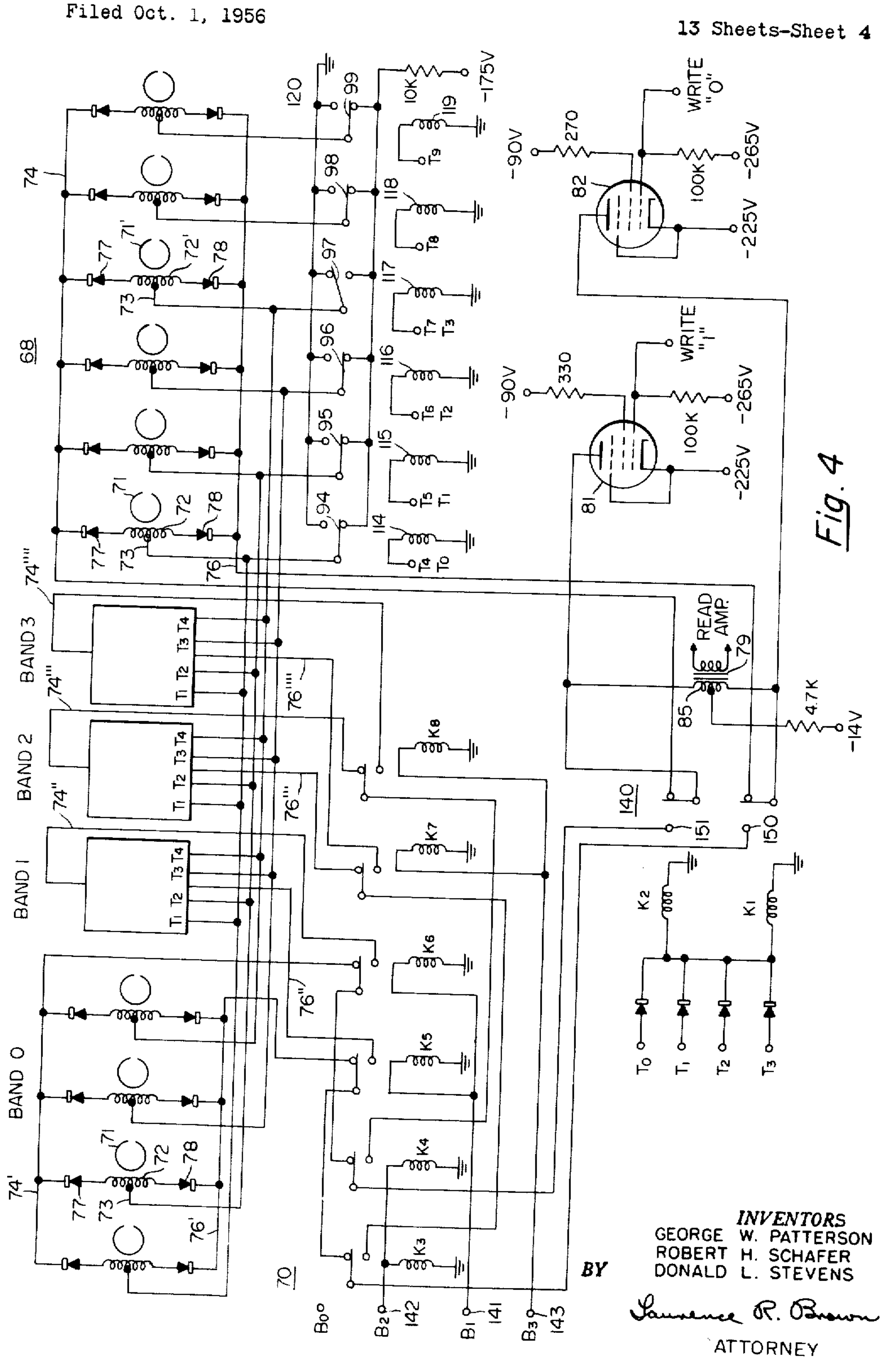
FIG. 4 is a schematic circuit diagram of a band-switching memory system employed in an embodiment of the invention.
Figure 5:
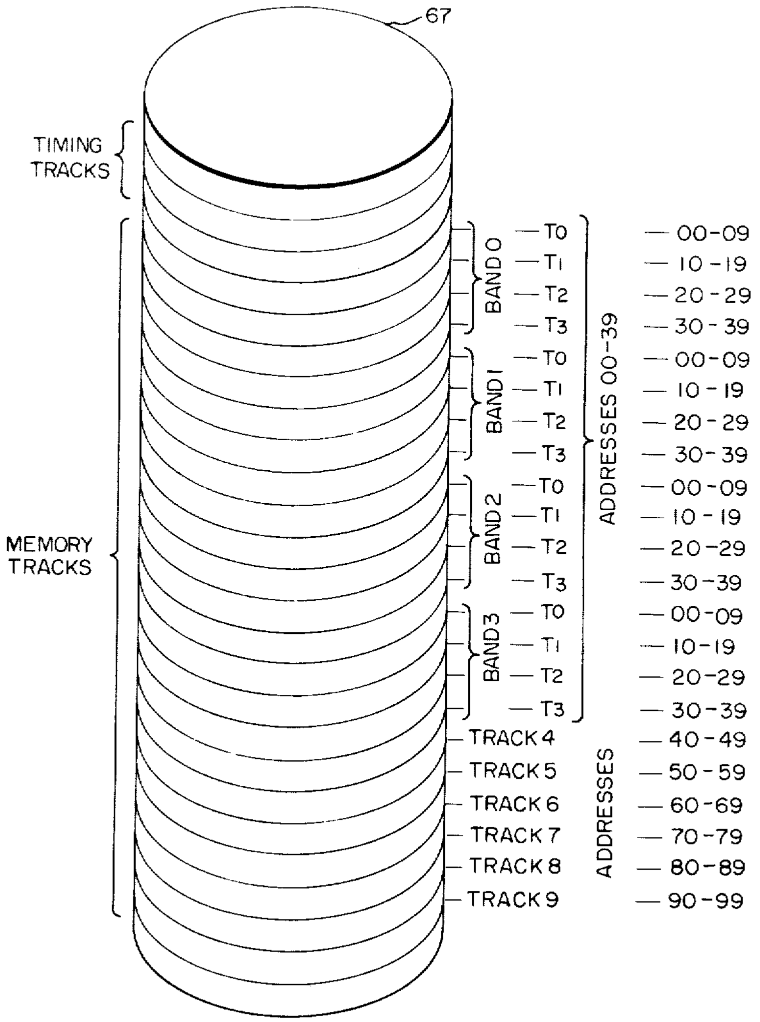
FIG. 5 is a diagrammatic view of a magnetic drum memory device employed in accordance with the invention.

The circuits shown in FIG. 4 are described and claimed in the co-pending United States application of Donald Best, S. N. 564,744, filed February 10, 1956, now Patent No. 2,910,671. The manner of selecting different memory tracks of a twenty-two channel memory system utilizing four optional bands 0, 1, 2 and 3 of four tracks each and a fixed group, 68, of six channels is schematically shown. Each channel has a separate reading head 71 together with a corresponding winding 72 having a center tap 73. The switching selection of the respective channels is made in the general manner described in the co-pending United States application of George G. Hoberg, S.N. 315,892, filed October 15, 1952, now Patent No. 2,932,008.

In this selection scheme each winding 72 is connected to a pair of buses 74 and 76 by a corresponding pair of crystal diodes 77 and 78. The respective buses 74 and 76 are coupled by switches 150 and 151 to both a transformer 79 for producing a reading signal in response to signals induced in the head winding 72, and to the write "1" and write "0" circuits utilizing amplifier tubes 81 and 82. The voltages at the read transformer primary winding 85 and at the write amplifier tubes 81 and 82, are selected such that the diodes 77 and 78 are blocked whenever any of the track selection switches 94 through 99 are in their normally closed position and connected to the —175 volt terminal. However, when the center tap of a particular winding 72′ is selected by a relay solenoid 117, so that the center tap is connected to the grounded bus 120, the diodes 77 and 78 are unblocked and this permits either a reading signal to be developed at the read amplifier transformer 79 or a writing signal to be developed at a respective half of the head winding 72′ if a write condition appears at either tube 81 or 82. Accordingly, by actuation of one of the relay solenoids 114 through 119 with tens level address signals specifying the selection of one of the tracks $T_0$ through $T_9$, a particular transducer head 71′ is selected for both reading and writing operation. Normally the track signals $T_0$ through $T_9$ will be obtained whenever the tens level at the pinboard section 23 or manual instruction switch as shown in FIGURE 2 are specified.

In general, the switching circuits of relay solenoids K1 through K8 are in their normal inoperated position set up to connect the four channels of band 0 together with the six channels of the fixed band into the available memory system. Therefore, band selection signals B1, B2 or B3 are necessary at terminals 141 through 143 respectively for designating substitution of bands "1," "2" or "3" in the place of band "0." These signals may be supplied by a band stepping switch in a manner referred to hereinafter. Corresponding ones of the relay solenoids K3 through K8 are actuated in order to provide connection of corresponding ones of the buses 74 and 76 representing the selected bands to the terminals 150 and 151. The operated position of relay solenoids K1 and K2 in response to tens level signals "0" through "3" designate terminals 150 and 151 for connection with the write amplifier tubes 81 and 82 and the rear amplifier transformer 79. Thus, whenever tracks $T_0$ through $T_3$ are selected, operational signals are received for relay solenoids K1 and K2 to transfer control of the reading and writing circuits to the selected band 0 through 3 rather than the fixed band 68. The band signals B1 through B3 also specify operation of relay solenoids K3 through K8 for specification of the properly selected bands.

The band switch in general may comprise a stepping switch similar to the E switch hereinbefore described. It is therefore subject to a homing operation by pinning H3b and to being set in response to a digit separated from the accumulator of the arithmetic unit 80 at "and" circuit 83 of FIG. 1 by pinning H7–. This operation is similar to that of stepping switch E and therefore is not reiterated in detail.

Figure 6:
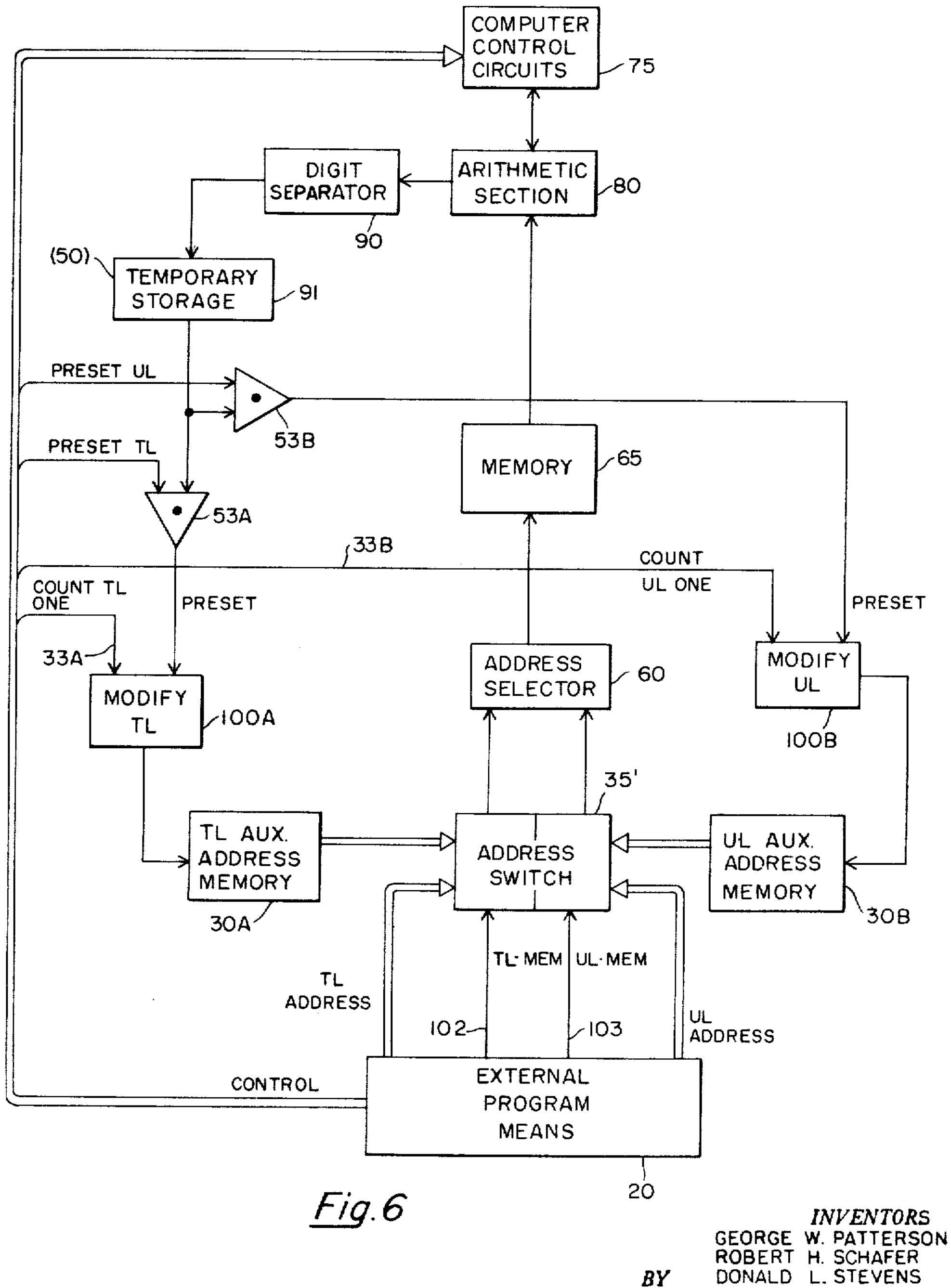
FIG. 6 is a further block system diagram of an improved computer system incorporating the invention.

Whenever it is desirable to utilize separate address registers for different address digits, the system of FIGURE 6 may be employed. This system is generally similar to that of FIGURE 1, except that separate address registers 30*a* and 30*b* are provided for respectively containing two digits, respectively labelled to identify the tens level and units level address characters, although more flexible use of these characters is made in the manner hereinafter described. Control circuits therefore are provided for separate handling of the respective digits in response to programmed instructions. This may be taken into account by utilizing the program words heretofore mentioned, H4–, H5– and H6– to respectively signify setting of the tens level auxiliary memory to a digit separated from the data carried in the arithmetic section 80, setting the units level register in the same manner, and setting both registers simultaneously in the same manner.

Since the general manner of controlling information with these appropriate instructions has been heretofore discussed, the logic of FIGURE 6 is presented in simplified form. Thus, generalized instructions are signified at the "and" circuits 53*a* and 53*b*. Likewise, the control circuits for respectively modifying the registered address characters in the tens level auxiliary memory 30*a* and the units level auxiliary memory 30*b* are signified in block form 100*a* and 100*b*. The corresponding reference characters throughout FIGURE 6 will indicate the comparative features of FIGURE 1. The modified address switching circuit 35′, while generally similar to the previously described switching circuit, provides for more flexibility in operation, since the separate address characters can be used independently or in unison, as specified by control portions of external program words specifying the tens level memory or units level memory instructions at respective leads 102 and 103. In order to expedite timing and control between the arithmetic section 80 and the auxiliary address memories in the manner performed by the hereinbefore described E switch section 4, which provides for control at a specified digit, the electronic equivalent comprising temporary storage register 91 is provided, and is described in detail hereinafter.

Figure 7:
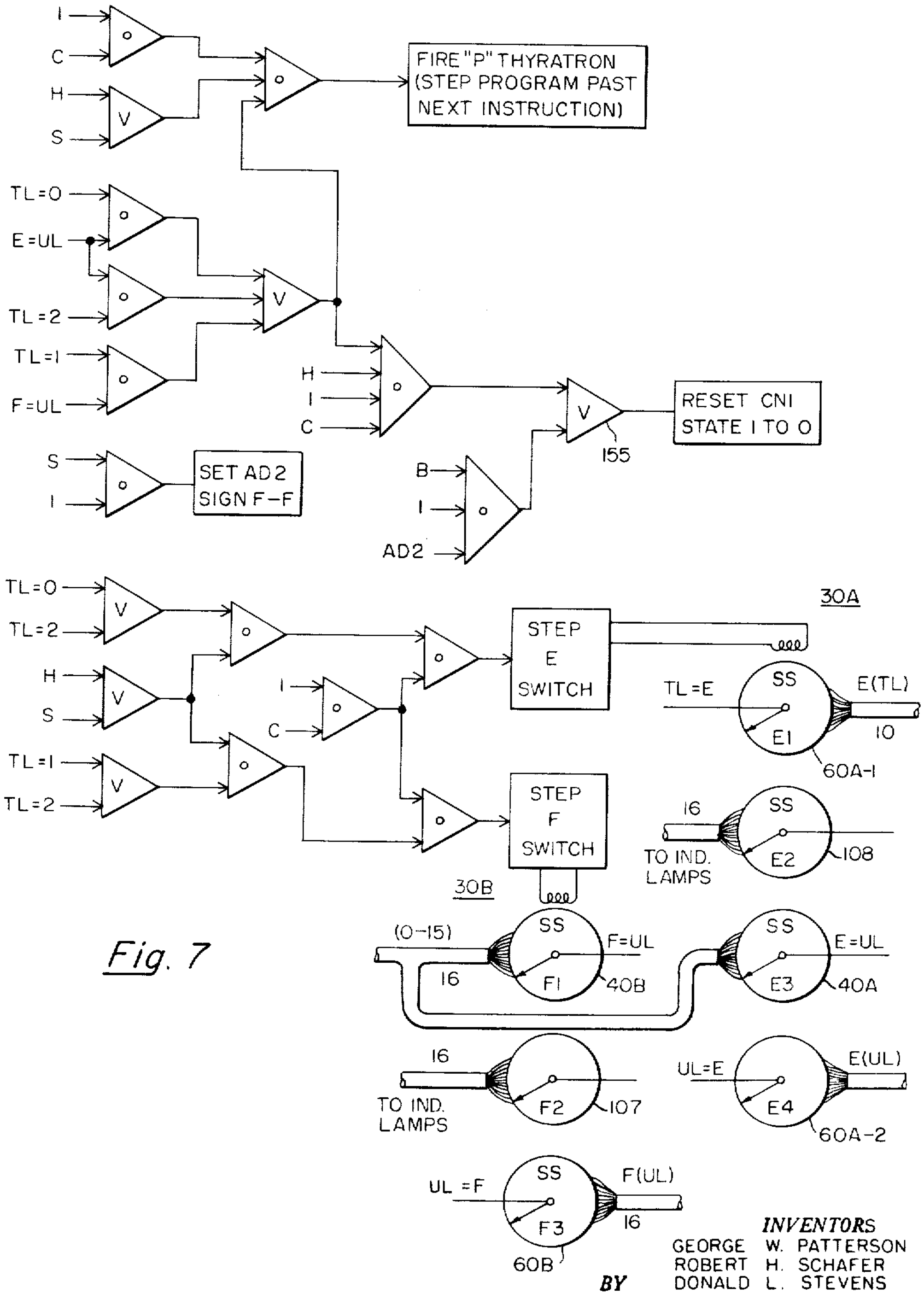
FIG. 7 is a logical block diagram of improved auxiliary address register means utilized in the system of FIG. 6.

The two auxiliary memory devices may constitute stepping switches of the type hereinbefore described as illustrated by FIGURE 7, wherein the switches are outlined, together with the control functions necessary for operation with a computer system of the type hereinbefore identified.

In this arrangement, the two switch sections 40*a* and 40*b* respectively indicate the matching function switch control level and sections 60*a*–1 and 60*b* represent the corresponding tens level and units level address register portions of the respective switches E and F. As may be seen by switch sections 60*a*–2, this E switch has corresponding address sections 1 and 4 similar to those sections 1 and 2 discussed in connection with FIGURE 3, whereas stepping switch F has a single address section 60*b* for specifying the units level operation only. Separate switch sections 107 and 108 may be utilized for specifying at an indicator panel such as 109 of FIGURE 2 respective stepping switch settings when push puttons 104 and 105 are closed.

The following chart will indicate the various program combinations for control of the stepping switches in performing their various functions.

| | | | |
|---|---|---|---|
| H | 0 | *b* | Home E to *b*. |
| H | 1 | *b* | Home F to *b*. |
| H | 2 | *b* | Home E to *b* and advance E same number of places. |
| H | 4 | – | Advance E by amount in least significant digit of accumulator. |
| H | 5 | – | Advance F by amount in least significant digit of accumulator. |
| H | 6 | – | Advance E and F by amount in least significant digit of accumulator. |
| H | 3 | *b* | Home band switch to *b*. |
| H | 7 | – | Advance band switch by amount in least significant digit of accumulator. |
| S | 0 | *b* | Step the E switch once: then if $E \neq b+1$ execute the next instruction; if $E=b+1$ execute the instruction. After the next instruction. |
| S | 1 | *b* | Same as above, but using the F switch. |
| S | 2 | *b* | Step E and F switches once; if $E \neq b+1$ execute the next instruction. If $E=b+1$ execute the instruction after a next instruction. |

The "or" and "and" logical circuit of FIGURE 7 are connected to signify operation in accordance with corresponding instructions available from the control portion of the program word and internal computer operation conditions which are specified in more detail hereinafter.

Figure 8:
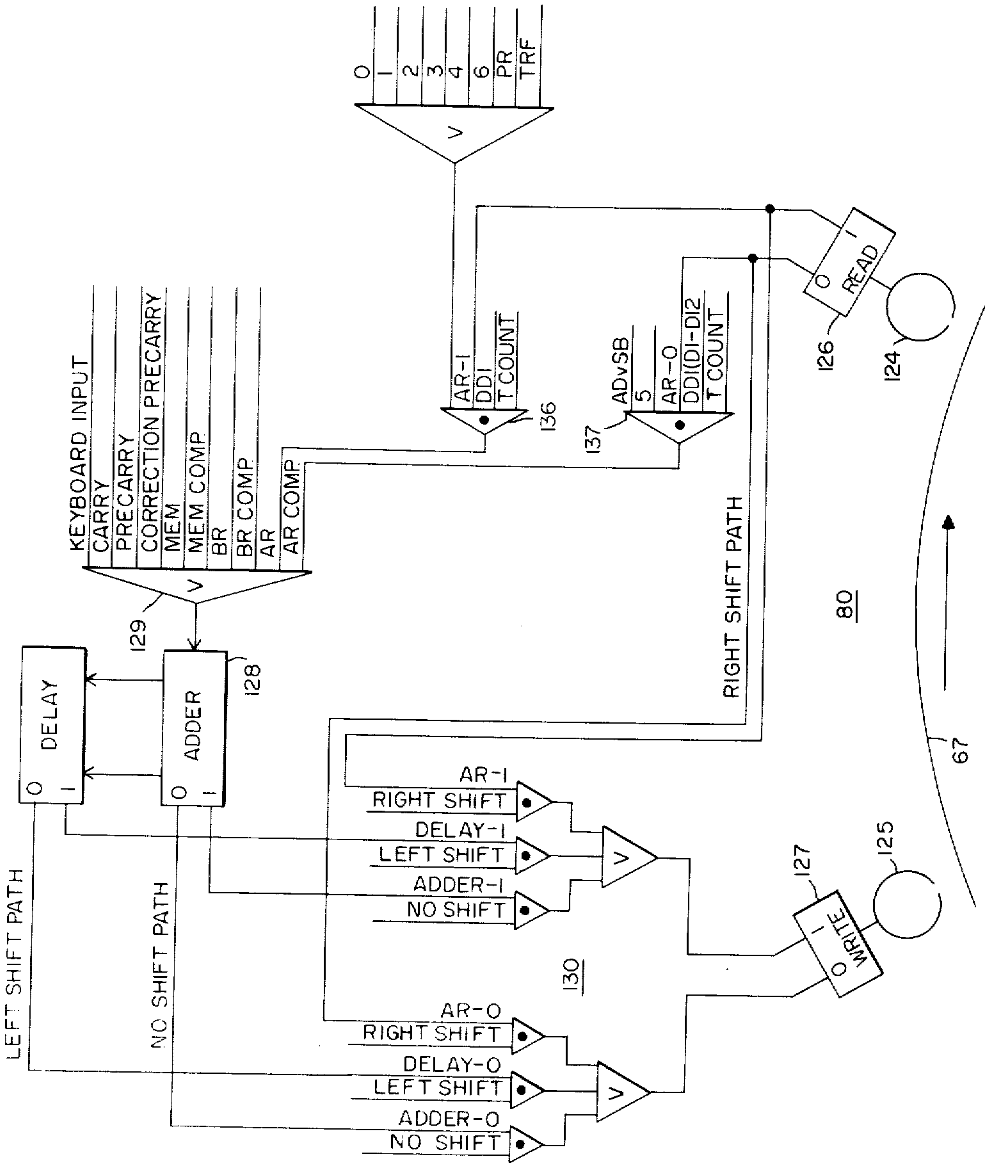
FIG. 8 is a logical diagram of an accumulator and other circuitry utilized in accordance with the invention.

In separating the required digit from the arithmetic section, as performed in accordance with the invention, an accumulator comprising a re-circulating track upon the drum 67 (FIGURE 5) may be utilized in the manner shown in FIGURE 8. Thus, a reading head 124 is used to process information through corresponding control circuits so that it is re-entered upon the same drum track at write head 125. The respective reading and writing circuits 126 and 127 are utilized respectively to read and write both the binary digits 0 and 1 which are each in the form of pulses representing the presence of the corresponding binary polarity at signified clock pulse times. Thus, signals in the accumulator register are thereby read in the form of two complementary pulse trains specifically designated AR–0 or AR–1. Different logical operations and operating conditions are specified by other terminology employed at the various circuits. Thus it is seen that information may be entered at adder circuit 128 from any of the sources specified at "or" circuit 129. Shifting of the signals is accomplished by corresponding control instructions at the logical circuits 130 by providing respectively no delay, one digit or two digits delay in the accumulator loop, wherein the one digit delay in the normal no-shift path is provided by the adder circuit 128.

Figure 9:
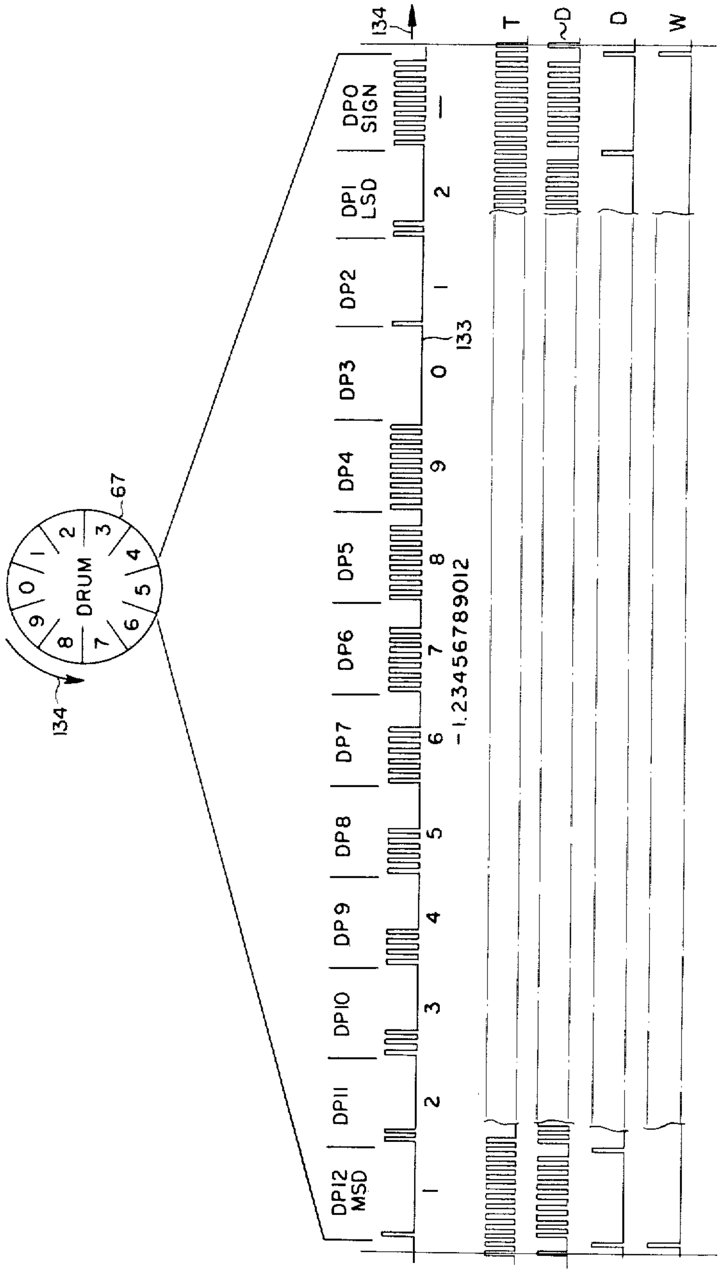
FIG. 9 is a diagrammatic view of data and timing signal information as presented in the described embodiment of the invention.

In order to clarify the manner of separating a desired digit from the arithmetic unit, as signified by the accumulator loop of FIGURE 8, the digit display of FIGURE 9 may be considered. Thus, the presentation of a single data word is displayed in waveform 133. It is noted that the information is presented by binary digits written upon the drum in pulse count notation. Each word is found in one of the memory locations which comprises one of the ten sectors about one track of the drum and is read in serial fashion from right to left, as indicated by the arrows 134. The sign is in digit position "0" so that it may be separated to signify the required arithmetic operations for the remainder of the word and thereafter the information is presented the least significant digit first, in serial fashion, until the most significant digit position "12" is reached. Between each of the decimal digits is positioned a guard cell of one binary bit and therefore each decimal digit position provides for ten binary bits wherein a maximum of nine is recorded, respectively for either a minus sign or a decimal digit "9." In order to clarify the logical circuits herein described, the data are presented with corresponding timing signals. The T clock pulses represent timing pulses which are presented at every binary bit position. The ∼D pulses represent those digit pulses which are presented at any possible recorded position upon the track, thereby excluding the guard cell position which occurs at the D digit pulse time. For control purposes in the specific computer above referencer, the ~D pulses are at twice the frequency of the T pulses, but only that portion is shown relating to the recorded data of word 133, which will afford an understanding of the principle involved without unnecessary detail. The D pulses identify each decimal digit and occurs during the guard cell period, whereas each sector is represented by a W pulse at D time between two succeeding word sectors. Likewise, there are two further control signals spaced upon the drum, one half drum revolution apart, comprising the B and C timing pulses, which signify the beginning of the track and a further control pulse to permit certain computer operations to occur during half a drum revolution. The B pulses occur one T time after the presentation of an initial W pulse and the C pulse occurs one half drum revolution later, plus one half T pulse time.

Figure 10:
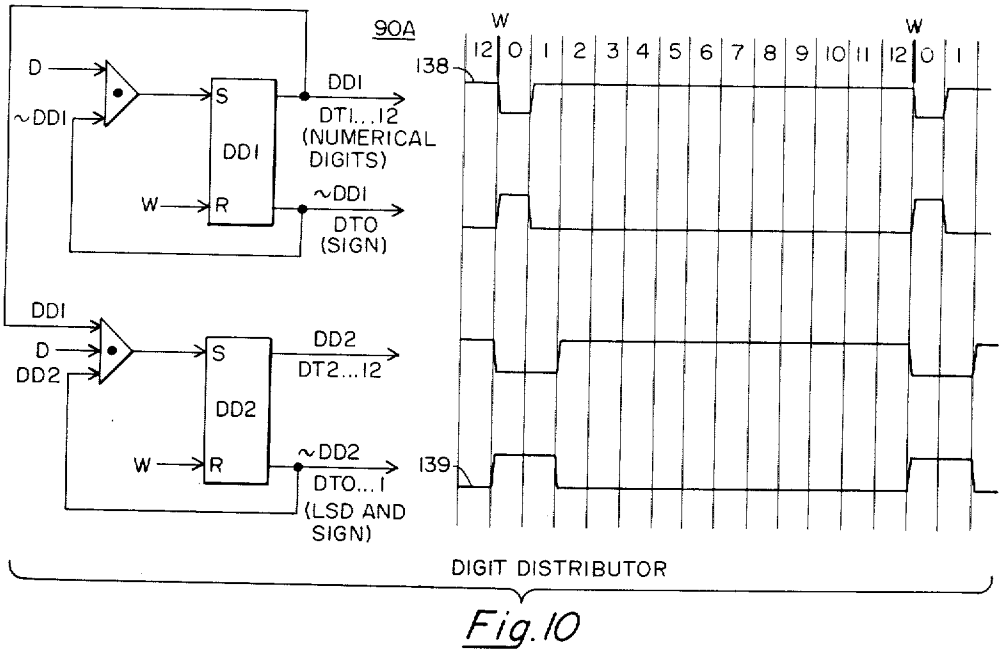
FIG. 10 is a combined logical and waveform diagram of digit separation control means as employed in the described embodiment of the invention.

It is seen that these timing signals are employed in the digit distributor circuit of FIGURE 10 to develop special waveforms 138 and 139. Thus, the DD1 signal waveform 138 represents the time during which data information omitting the sign in digit position 0 is presented. Data of this nature is re-circulated through the accumulator loop, as signified at "and" gates 136 and 137 of FIGURE 8. Likewise, the digit distributor ~DD2 signal waveform 139 signifies the time during which both the sign digit and the least significant data digit are identified. By combining the DD1 and ~DD2 signal waveforms therefore, a single waveform is developed identifying the least significant digit. That digit therefore may be separated from the accumulator and the digit distributor circuit 90A of FIGURE 10 serves as digit separator means for controlling removal of information from the arithmetic or accumulator section of the computer. The DD1 and DD2 circuits are conventional flip flop circuits which provide D.C. output signals and are provided with respective terminals for setting and resetting in response to digit pulses D and word pulses W, respectively. These flip flop circuits may be constructed in a form similar to that hereinafter described in connection with FIGURE 12.

Figure 11:
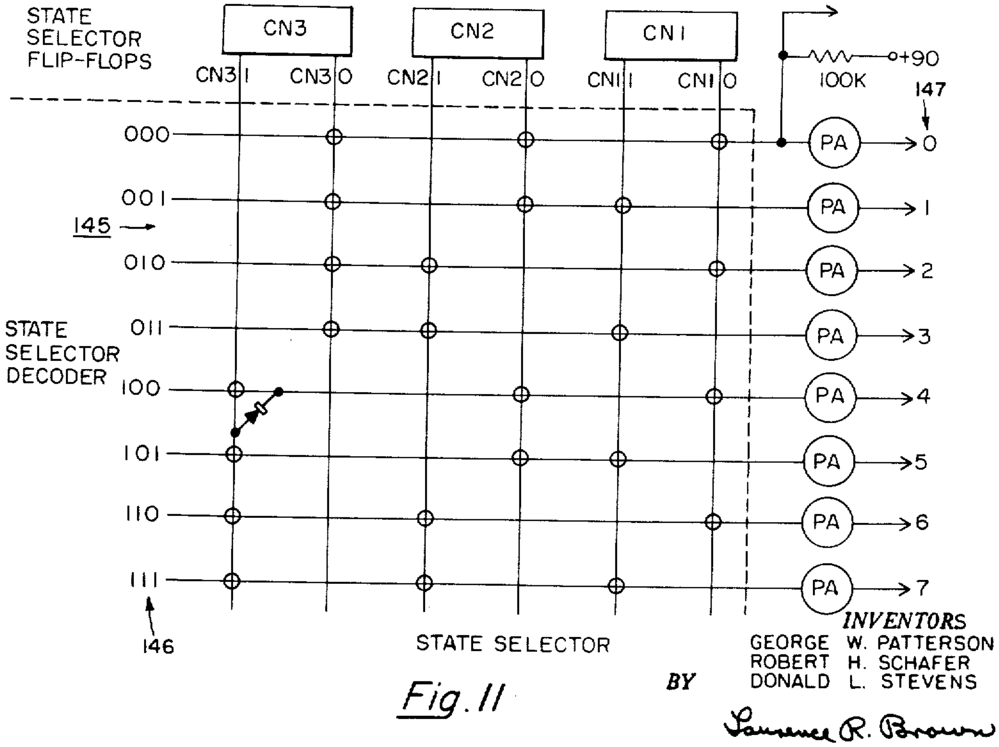
FIG. 11 is a logical diagram of a state selection control circuit for specifying different modes of operation in a typical data processing system employing the invention.

Further flip flop circuits designated CN1, CN2 and CN3 are utilized in connection with the state selector circuit shown in FIGURE 11. This state selector comprises a diode matrix 145 which provides, in response to the corresponding flip flop states designated in column 146, respective output states shown in column 147. In general, the "0" state represents the idling state of the computer and various operating functions are performed during the other states of the computer. Throughout the control circuitry shown in the drawings, the state is represented by the corresponding number, such as "1," which indicates operation only when the flip flops CN3, CN2 and CN1 are respectively in state "0," "0," "1." Thus, a signal for resetting flip flop CN1 to CN1, or CN1=0 will change control from state "1" to the idling state "0." Such operation is shown in connection with FIGURE 7 at "or" circuit 155, for example.

Figure 12:
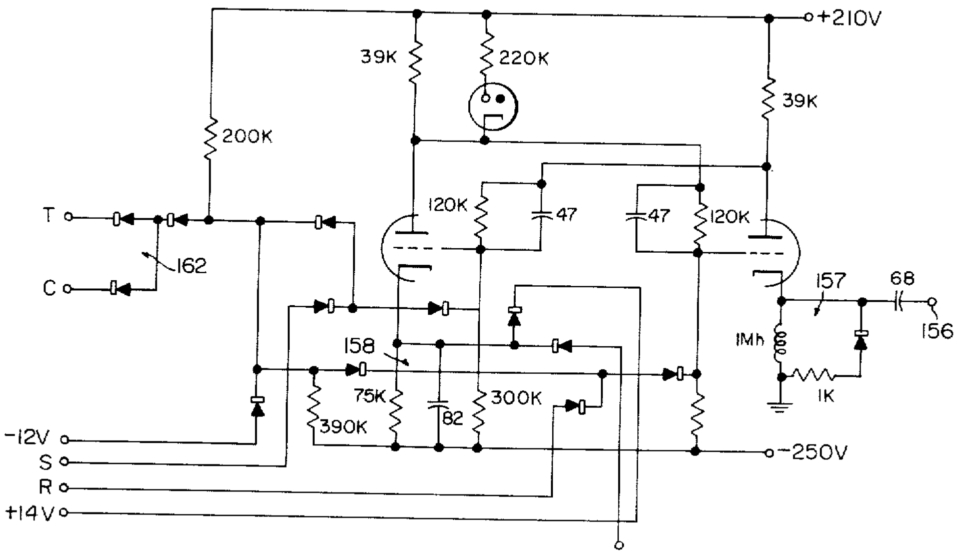
FIG. 12 is a schematic diagram of a typical flip flop circuit which may be used in accordance with the invention.

A typical flip flop circuit is shown schematically in FIGURE 12 in generalized form to indicate the several aspects of operation which may be employed in a data processing system. Thus, a pulsed output may be provided at terminal 156 by medium of a pulse forming inductive circuit 157 or, conversely, a static D.C. output level may be obtained by means of a resistive circuit 158. In any event, the flip flop circuit may be either set, reset or complemented at corresponding terminals S, R and C when provided with properly timed signal pulses. Output signals may be obtained in either static condition or during transition from circuit connections corresponding to 156 and 157. These flip flop circuits may be used to provide a decimal counter circuit or decimal digit register of the type illustrated in block diagram in FIGURE 13.

Figure 13:
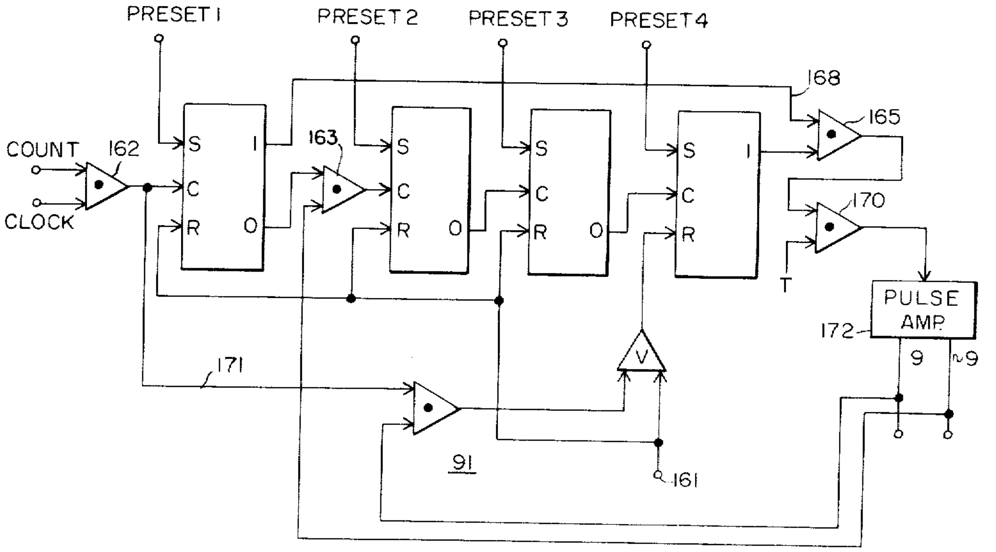
FIG. 13 is a counter circuit for processing an address digit in one embodiment of the invention.

The counter circuit in FIGURE 13 may be used as the electronic device 91, shown in FIGURE 6 to provide a control output signal at any specified count in the manner of stepping switch E, section 4, described in connection with FIGURE 3. The counter may be preset in any desired state after being cleared at terminal 161, and counting can occur at input gate 162. During the counting operation, the transition flip flop output signal therefore at the "0" reset output lead of the first stage will cause switching of the second flip flop stage unless the ~"9" inhibit signal, comprising a reversed polarity "9" signal output of the counter, is present. Thus, the transfer path of a switching signal to the second flip flop circuit includes the inhibit gate 163. The second flip flop circuit will effect a binary count with its transition output signal "0" complementing the third flip flop circuit which is likewise connected in cascade circuit with the fourth flip flop circuit. Thus, a normal binary count is effected in the four stages in the absence of inhibit pulse ~"9" so that the fourth flip flop circuit is set to "1" with the receipt of the eighth input pulse. This, because of output signal gate 165 will not provide an output signal since, under this condition, the first flip flop circuit will be reset to "0.". As the ninth input counting pulse is received, however, the first flip flop circuit will be switched to its set condition to produce the required signal at lead 168 without upsetting the fourth flip flop state and thus provide the required 9 output signal at "and" circuits 165 and 170. Because of the inhibit gate circuit 163, the binary count is interrupted for the next or tenth count when the first stage is reset. Since the second and third flip flop circuits are in the reset state at this time, the tenth pulse arriving at the input terminal of the fourth stage by way of reset lead 171 will serve to reset stage four as well as state one thus returning the entire counter to its cleared condition during a ten count and enable it to perform a further decimal count. Thus, the counting action progresses as shown by the state of the four flip flop circuits in the following chart:

| | | | |
|---|---|---|---|
| Reset | 0 0 0 0 | 6 | 0 1 1 0 |
| 1 | 1 0 0 0 | 7 | 1 1 1 0 |
| 2 | 0 1 0 0 | 8 | 0 0 0 1 |
| 3 | 1 1 0 0 | 9 | 1 0 0 1 |
| 4 | 0 0 1 0 | 10 | 0 0 0 0 |
| 5 | 1 0 1 0 | | |

As seen from action of "and" circuit 170, a continual stream of pulses will be provided by pulse amplifier 172 whenever a static output signal is received from "and" circuit 165, thereby providing both positive "9" signals and negative ~"9" signals at the specified clock pulse times T. Accordingly, it is seen that since the output pulses are provided only after the counter reaches "9," the input count signals of any decimal digit may be received from the accumulator into the reset counter, placing the counter in storage condition. Count out then occurs to provide a specified time count in the manner afforded by the fourth section of stepping switch E of FIGURE 3. In general, the complement of the number in the accumulator is therefore read into the counter in the manner specified in the sector address locating circuit of FIGURE 14, wherein the entire counter of FIGURE 13 is presented in block form as counter VI.

Figure 14:
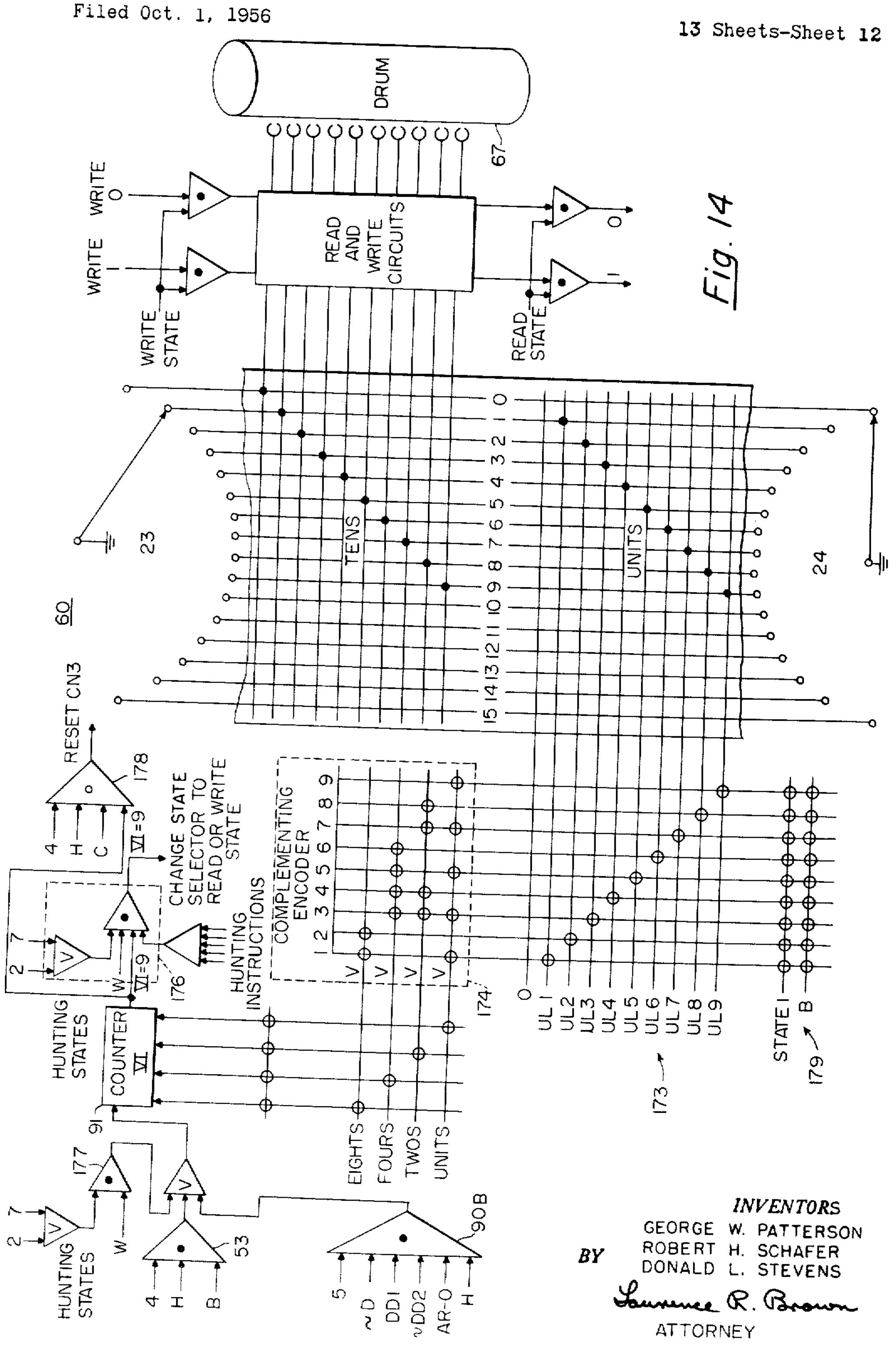
FIG. 14 is a logical diagram of a sector address locating circuit embodying the invention.

As shown in FIGURE 14, the same counter VI circuit, 91, may be used both for the stepping switch function while presetting the auxiliary memory registers with the information separated from the accumulator circuit, and for selecting the sector portion of the memory in response to a corresponding address character.

In the address selector portion 60 of FIGURE 14, the respective tens and units selector switches 23 and 24 may comprise either the external pinboard or internal stepping switch address selector units. The tens matrix, together with selector switch 23 selects one of the corresponding ten tracks upon the drum 67. The units selection matrix, together with switch 24 is passed through timing section 173 to complementing encoder 174 and binary converter 175, and thereafter serves to preset the counter VI so that output logical circuits 176 permit the choice of the proper selector state in response to the counting of the required number of word pulses at input "and" circuit 177.

Since the sector location is accomplished in state "1," as shown at timing section 179, provision is made as outlined in FIGS. 15*a* and *b* for going to state "5" whenever the homing instruction H is encountered. During state "5" the digit is separated from the accumulator at the digit separator circuit 90B and read into the counter 91. As hereinbefore discussed the combination of DD1 and ∼DD2 gating signals effects the selection of the least significant digit at times during which the clock pulses ∼D are presented. In order to complement the counter 91, the accumulator signals AR–0 are read into the counter VI which is previously reset. In this manner, an output signal VI=9 is developed in response to a readout count of B pulses equal to that digit taken from the accumulator, as provided at the "and" circuit 53. This circuit provides for counting B pulses for each drum revolution into counter VI until reset to state "0" occurs upon the count of VI=9 as provided at "and" circuit 178. Thus, as seen from FIGS. 15*c* and *d* the E and F switches may be counted once for each drum revolution with incoming B pulses while the computer resides in state 4.

Figure 15:
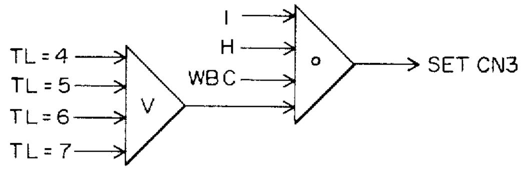
FIG. 15 is a logical chart illustrating sequence of a computer system constructed in accordance with the invention.
Figure 15:
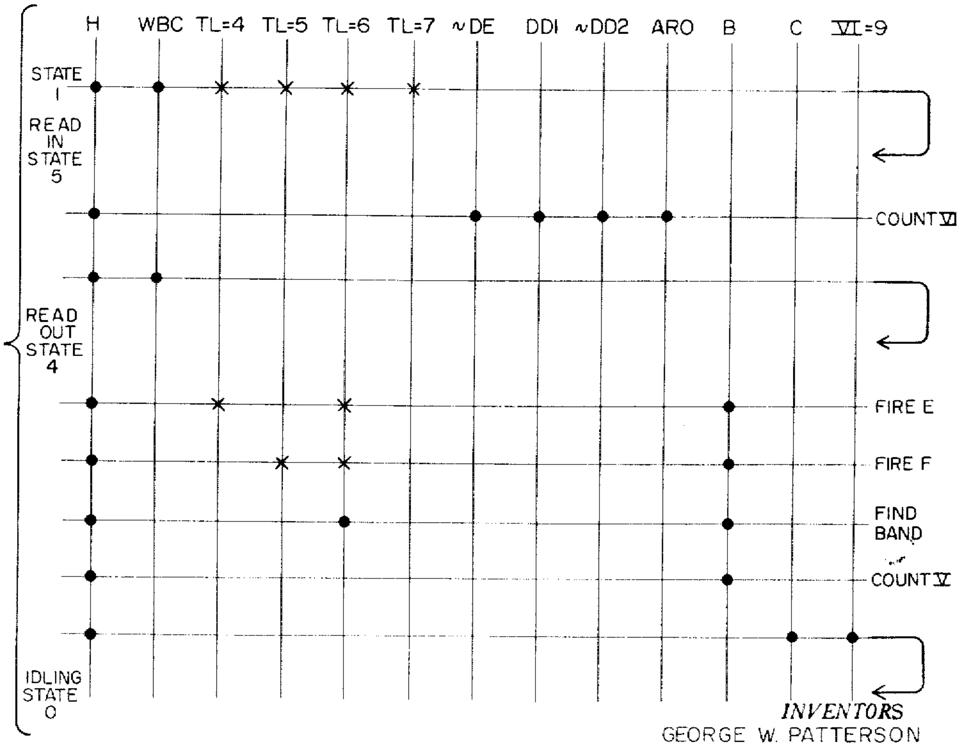

Also in FIGURE 15, are illustrated the various logical operations performed in setting either the E, F or band stepping switches to the least significant digit in the accumulator. When both the tens level and units level digits are to be read from the accumulator into the respective switches, the control instructions set up in the external program means may call for a shift-right instruction to shift a further digit into the least significant digit position. Where normalization is required thereafter, the accumulator data may be restored to the proper decimal position by shifting left. It is evident, therefore, that a sequence of instruction may be provided for removing address information from the data to the sector counter VI of FIGURE 14 for positioning the stepping switches therefrom whenever the homing (H) instruction removes the computer from state "1" wherein the sector counter is used locating the address information. In state 5, as seen in FIGS. 15*b* and *d*, the information in the arithmetic section or accumulator register is separated for reading into counter VI, whereafter the next word pulse will cause the computer to go to state "4" to perform the various functions shown in FIGS. 15*c* and *d*.

In state 4 the stepping switches will fire at B time, as designed by the proper tens level digit, if the H instruction is pinned. Likewise, each B pulse counts counter VI so that the homing position can be identified for reset to state "0" upon reaching the count of "9." This change of state occurs upon arrival of a C pulse. Therefore, the already existing address sector counter VI is used for the purpose of homing the stepping switches to the accumulator position with a minimum of external logical circuitry.

It is accordingly evident that an externally programmed commuter, by these expedients, is improved to the extent that it becomes highly flexible and presents many of the advantages performed by the more complex circuitry of internally programmed computers. Thus, the improved and novel features believed representative of the nature of the invention are described with particularity in the appended claims.

We claim:

1. An address selection circuit in an electronic computer for specifying the address of data in a memory device comprising, an arithmetic unit including at least a data containing accumulator, data separation means coupled to said arithmetic unit for separating certain data from said accumulator, said data to be separated comprising an address word, an address register comprising a plurality of resettable stepping switches, a plugboard for specifying a program word comprising a control portion and an address portion, a memory device having a plurality of memory locations thereon, address selection means cooperating with said memory device for selecting a location upon said memory device, first gating means coupling said address register to said address selection means, second gating means coupling said plugboard to said address selection means, means coupling said data separating means to said address register, and computer control circuit means cooperating with said plugboard and responsive to said control portion of said plugboard program word and further cooperating wtih said arithmetic unit and optionally directing said data separation means to separate the data stored in said accumulator comprising the address word and transferring said separated data through said data separating means to said address register for specifying a location upon said memory device, or optionally specifying an address on said memory device from said plugboard through said second gating means to said address selection means.

2. The combination as defined in claim 1 wherein means is provided to direct said computer control circuit means to advance said address register sequentially and thereby select the following addresses upon said memory.

3. The combination as defined in claim 1 wherein means is provided to direct said control circuit means to index said address register at a specified digit to thereby select a specified address upon said memory.

4. An address selection circuit in an electronic computer for specifying the address of data in a memory device comprising, an arithmetic unit comprising at least a data containing accumulator, data separation means coupled to said arithmetic unit for separating certain data from said accumultor, said data to be separated comprising an address word, an address register comprising a plurality of resettable stepping switches, a memory device having a plurality of memory locations thereon, address selection means cooperating with said memory device for selecting a location upon said memory device, gating means coup'ed between said address register and said address selection means, means coupling said data separating means to said address register, control means, and computer control circuit means responsive to said control means and cooperating with said arithmetic unit for directing said data separation means to separate the data stored in said accumulator comprising the address word and transferring said separated data through said data separating means to said address register for specifying a location upon said memory device.

References Cited in the file of this patent

UNITED STATES PATENTS

| | | |
|---|---|---|
| 2,540,654 | Cohen | Feb. 6, 1951 |
| 2,636,672 | Hamilton | Apr. 28, 1953 |
| 2,679,638 | Bensky | May 25, 1954 |
| 2,755,996 | Williams | July 24, 1956 |
| 2,815,168 | Zukin | Dec. 3, 1957 |
| 2,840,304 | Williams | June 24, 1958 |

FOREIGN PATENTS

| | | |
|---|---|---|
| 734,073 | Great Britain | July 27, 1955 |
| 742,525 | Great Britain | Dec. 30, 1955 |

OTHER REFERENCES

24-Digit Parallel Computer with Magnetic Drum Memory, ERA, published in 1949. Pages 10, 11, 42–44; FIGURES 3.5–1, 3.5–4, 3.5–5, 3.5–6 and 3.5–7 relevant.

Auerbach: "The BINAC," Proc. IRE, Jan. 1952, pp. 12–28.

Journal of Scientific Instruments, Oct. 1952, "An Electronic Computer" by Beard, vol. 29, No. 10, pages 305–311.

UNITED STATES PATENT OFFICE

CERTIFICATE OF CORRECTION

Patent No. 3,014,660 December 26, 1961

George W. Patterson et al.

It is hereby certified that error appears in the above numbered patent requiring correction and that the said Letters Patent should read as corrected below.

Column 1, line 22, for "work" read -- word --; column 2, line 34, after "ex-" insert -- ternally programmed data processing systems permitting --; column 6, line 70, for "rear" read -- read --.

Signed and sealed this 1st day of May 1962.

(SEAL)
Attest:

ERNEST W. SWIDER
Attesting Officer

DAVID L. LADD
Commissioner of Patents